United States Patent
Hays et al.

(10) Patent No.: US 10,627,522 B2
(45) Date of Patent: Apr. 21, 2020

(54) SYSTEM AND METHOD FOR AN EDGE INJECTION ETALON

(71) Applicant: Michigan Aerospace Corporation, Ann Arbor, MI (US)

(72) Inventors: Paul Byron Hays, Ann Arbor, MI (US); Scott K. Lindemann, Ann Arbor, MI (US)

(73) Assignee: Michigan Aerospace Corporation, Ann Arbor, MI (US)

( * ) Notice: Subject to any disclaimer, the term of this patent is extended or adjusted under 35 U.S.C. 154(b) by 640 days.

(21) Appl. No.: 15/124,837

(22) PCT Filed: Mar. 12, 2015

(86) PCT No.: PCT/US2015/020063
§ 371 (c)(1),
(2) Date: Sep. 9, 2016

(87) PCT Pub. No.: WO2015/138663
PCT Pub. Date: Sep. 17, 2015

(65) Prior Publication Data
US 2017/0023679 A1    Jan. 26, 2017

Related U.S. Application Data

(60) Provisional application No. 61/951,809, filed on Mar. 12, 2014.

(51) Int. Cl.
*G01C 3/08* (2006.01)
*G01S 17/95* (2006.01)
*G01S 7/481* (2006.01)

(52) U.S. Cl.
CPC ............. *G01S 17/95* (2013.01); *G01S 7/4812* (2013.01)

(58) Field of Classification Search
CPC ........ G01S 17/95; G01S 7/4812; G01S 17/58; G01P 5/26
See application file for complete search history.

(56) References Cited

U.S. PATENT DOCUMENTS 8,427,649 B2 * 4/2013 Hays ...................... G01S 17/58
356/450

OTHER PUBLICATIONS

Shirasaki, Masataka. "Virtually Imaged Phased Array", Mar. 11, 1999. (Year: 1999).*

* cited by examiner

*Primary Examiner* — Samantha K Abraham
(74) *Attorney, Agent, or Firm* — Juan Carlos A. Marquez; Marquez IP Law Office, PLLC

(57) ABSTRACT

The invention is directed to a device and method for conducting measurement of a Doppler shift caused by molecular and aerosol movement while simultaneously providing measurement of temperature using LIDAR. The device incorporates a light source; and a Fabry-Perot etalon having a resonant cavity formed with two plane parallel reflecting surfaces, wherein the light source is positioned relative to the a Fabry-Perot etalon such that light is injected into a plane parallel resonant cavity of the Fabry-Perot etalon at an angle of incidence other than normal to the reflecting surfaces. The Fabry-Perot etalon may be formed with each of the parallel reflecting surfaces having different reflectivities. The light source may be positioned to direct the light to bypass a first reflective surface of the plane parallel resonator cavity, and/or implemented using a divergent light source. In addition, the Fabry-Perot etalon may be formed to include an aperture in at least one mirror surface or an edge portion in at least one mirror surface through which the light is directed into the resonant cavity. The (Continued)

device may also incorporate a detector for detecting a fringe pattern outputted by the Fabry-Perot etalon.

13 Claims, 19 Drawing Sheets

(A)

(B)

Cavity Injection Etalon
First Generation
Sunday Feb. 5th, 2006

Broad Source Radius=0.005mm R=0.90 t=10.0mm Air
Gap Line Full Width at Half Height=18 microns Aerosol or Laser Spectrum Cavity Injection Etalon Efficiency=95% Aerosol Scattering
R=0.85, T=1.0, Mu=1.47, Par=10.,0.22,0.03,1.0,1
Feb, 8th, 2006

SYSTEM AND METHOD FOR AN EDGE INJECTION ETALON

CROSS-REFERENCE TO RELATED APPLICATIONS

This U.S. National Stage claims priority to PCT Application PCT/US2015/020063 filed on Mar. 12, 2015, which claims priority to U.S. Provisional Patent Application Ser. No. 61/951,809, filed on Mar. 12, 2014. The entire content of each of the above-identified priority applications is incorporated herein by reference.

BACKGROUND OF THE INVENTION

The present invention is generally directed to Light Detection And Ranging (LIDAR) systems adapted to measure air data products on a variety of platforms, for example, including, but not limited to, satellites, aircraft, UAVs, glide weapon systems, ground-based platforms (stationary or mobile), and watercraft. Such LIDAR systems can be adapted to measure air data products of a variety of atmospheres, for example, that of the Earth or other planetary or celestial bodies, or can be adapted to measure or map air data products of fields within a wind tunnel or surrounding an aerodynamic body during the operation thereof. Furthermore, although one embodiment uses ultraviolet (UV) laser light, LIDAR systems can operate over a large range of wavelengths spanning from ultraviolet to infrared. The shorter wavelength ultraviolet light provides additional stealth characteristics for the system because the light is quickly absorbed by the atmosphere, and is not otherwise easily detected from relatively long-range distances. However, LIDAR systems can also operate in other wavelength regions, such as longer ultraviolet wavelengths or even visible wavelengths.

LIDAR systems in accordance with any of the above-described aspects can be used for any optical remote sensing scenario to provide atmospheric data, to characterize the atmosphere or to detect flow within the atmosphere. For example, LIDAR systems could be applied to the detection of Clear Air Turbulence, Optical Air Data systems, Atmospheric Aerosol Characterization, Smog detection and Chemical/Biological Agent detection. LIDAR systems can be used to provide air data for Field Artillery Fire Direction Control, Small Arms Wind correction, Airport Turbulence Monitoring and Ship Navigation velocity/weather monitoring. LIDAR systems can also be used to provide air data for predicting winds for any sporting events in which micro-scale airflow plays a significant role such as golf, football, baseball, etc. LIDAR systems can also be used to provide air data for Wind Farm Site Assessment, Wind Farm Monitoring, and Wind Turbine control.

Even more, LIDAR systems can be used to detect any object from which the beam of light would scatter, or to detect the flow of any medium through which the associated beam of light will propagate and from which the beam of light will scatter. For example, depending upon the wavelength of the light source 11, LIDAR systems could be used to detect the flow of other gases; or liquids, for example, water or liquid chemicals or solutions.

SUMMARY OF THE INVENTION

One direct detection LIDAR embodiment is based on the use of a Fabry-Perot interferometer (FPI) to allow measurement of the Doppler shift caused by molecular and aerosol movement and to simultaneously provide for measurement of temperature, the aerosol molecular ratio and the density as taught in U.S. Pat. No. 7,106,447. In this case, the interferometer is used in the method described in the text *Principles of Optics* by Born & Wolf, section 7.6, the entire contents of which are incorporated herein by reference.

In at least one embodiment, the present invention improves upon a technique found in U.S. Pat. No. 4,871,232, wherein the light is injected into the edge of the etalon instead of through the reflecting surfaces. The benefits of the edge injection are increased finesse and a stronger transmitted signal through the interferometer.

As shown in FIGS. 1A and 1B, a conventional plane parallel Fabry-Perot Interferometer (FPI) or etalon device 10 is composed of two mirrors 12a,12b of equal reflectivity spaced at a known distance D from one another where the light L to be analyzed by the device 10 is input normal to the device 10 through the reflective mirrors 12a,12b. The figures show that, with both air-spaced (FIG. 1A) and solid (FIG. 1B) etalons, the light L is injected into the cavity 12c through and normal to the reflective surfaces of the mirrors 12a,12b. It should be noted that in the conventional plane parallel FPI, the reflectivity of each of the plane mirrors is constant across the surface.

In at least one embodiment, the invention is directed to a method for conducting measurement of a Doppler shift caused by molecular and aerosol movement while simultaneously providing measurement of temperature using LIDAR. The method comprises the steps of: providing a light source; providing a Fabry-Perot etalon having a resonant cavity formed with two plane parallel reflecting surfaces; and injecting light from the light source into a plane parallel resonant cavity of the Fabry-Perot etalon at an angle of incidence other than normal to the reflecting surfaces. The method may also include steps such as forming each of the parallel reflecting surfaces with a reflectivity different from each other; and directing the light to bypass a first reflective surface of the plane parallel resonator cavity. The light source may be implemented using a divergent light source. Further, the light may be directed into the plane parallel resonant cavity through an aperture in at least one mirror surface of the Fabry-Perot etalon. Alternatively, the light may be directed into the plane parallel resonant cavity through an edge portion in at least one mirror surface of the Fabry-Perot etalon. Further, the method may also include steps such as providing a plurality of divergent light sources; and injecting light from the plurality of light sources into the plane parallel resonant cavity of the Fabry-Perot etalon.

In another embodiment, the invention may be directed to a light resolving device, comprising: a light source; and a Fabry-Perot etalon having a resonant cavity formed with two plane parallel reflecting surfaces, wherein the light source is operatively positioned relative to the a Fabry-Perot etalon such that light from the light source is injected into a plane parallel resonant cavity of the Fabry-Perot etalon at an angle of incidence other than normal to the reflecting surfaces. The Fabry-Perot etalon may be formed with each of the parallel reflecting surfaces having a reflectivity different from each other. The light source may be further positioned to direct the light to bypass a first reflective surface of the plane parallel resonator cavity. The light source may be implemented using a divergent light source. In addition, the Fabry-Perot etalon may be formed to include an aperture in at least one mirror surface thereof through which the light is directed into the plane parallel resonant cavity of the Fabry-Perot etalon. Alternatively, the Fabry-Perot etalon may include an edge portion in at least one mirror surface thereof through which the light is directed into the plane parallel resonant cavity of the Fabry-Perot etalon. Even more, the device may also incorporate a detector for detecting a fringe pattern outputted by the Fabry-Perot etalon.

The implementations of the light resolving device according to the invention may include a Doppler wind LIDAR including a light resolving element; an optical air data system including a light resolving element; and a high spectral resolution interferometer including a light resolving element.

BRIEF DESCRIPTION OF THE DRAWINGS

The invention will now be described more particularly with reference to the accompanying drawings which show, by way of example only, one embodiment of wave powered prime mover according to the invention, wherein.

DETAILED DESCRIPTION OF THE PREFERRED EMBODIMENTS

Figure 1A:
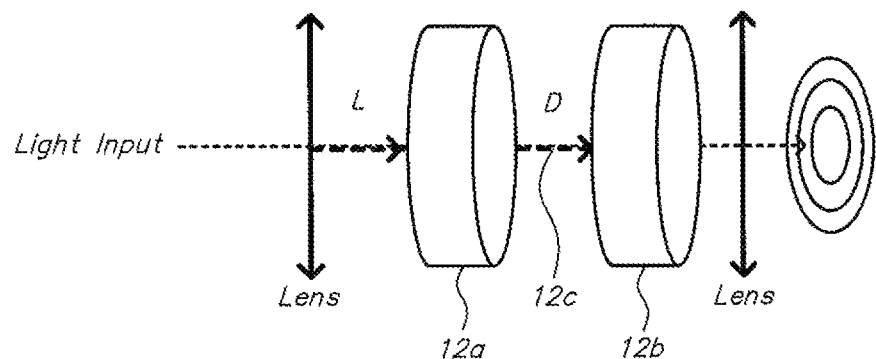
FIGS. 1A and 1B illustrate the setups of conventional Air-Gap and Solid-Gap Fabry-Perot interferometers.
Figure 1B:
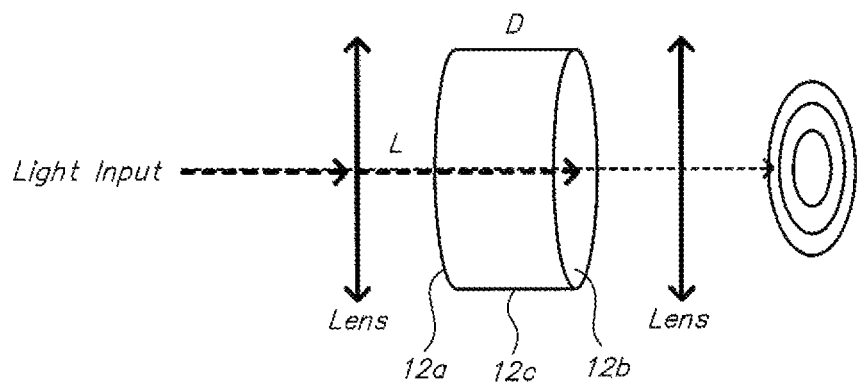
Figure 2A:
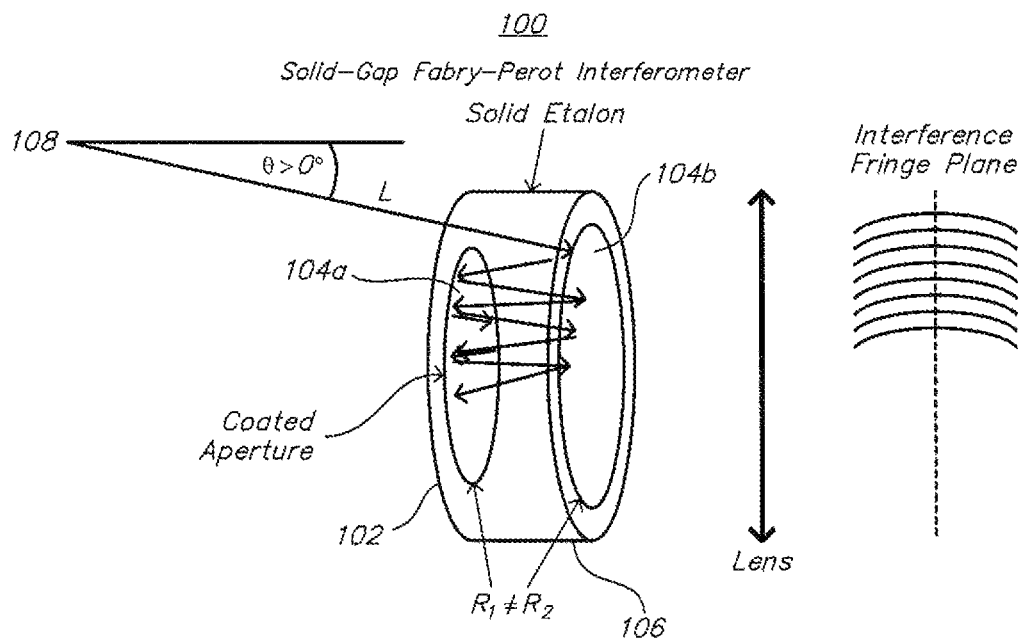
FIGS. 2A and 2B illustrate the cavity injected Fabry-Perot Interferometer according to the present invention.
Figure 2B:
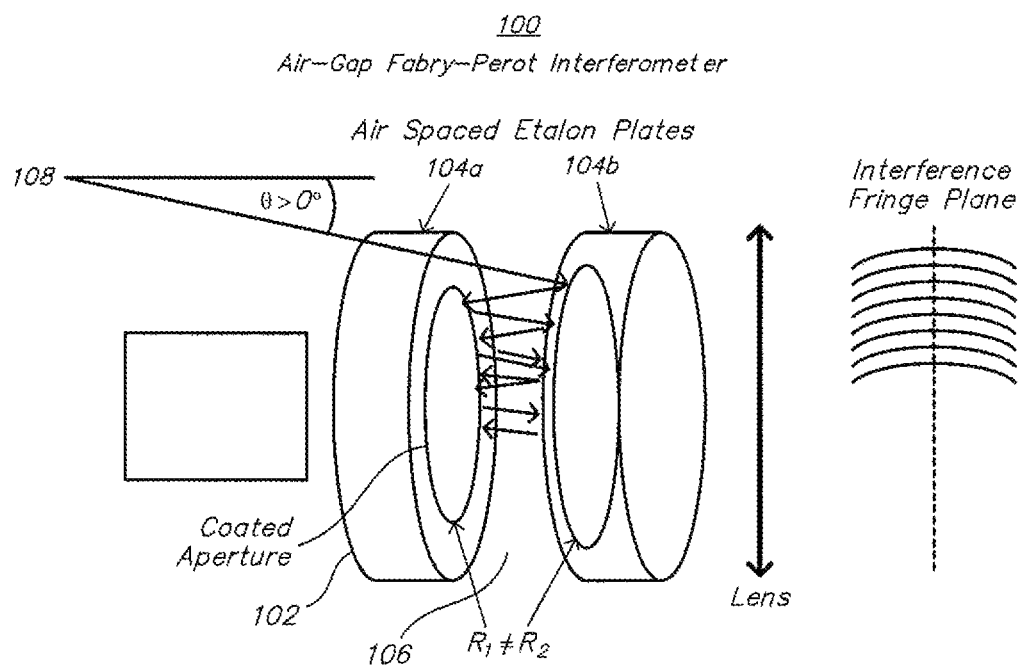
Figure 3A:
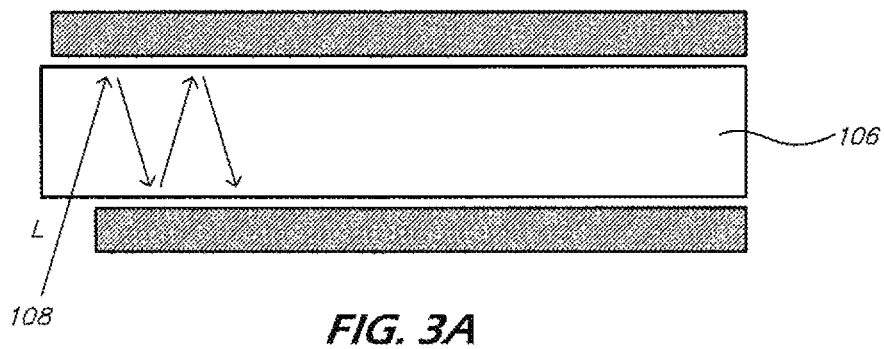
FIGS. 3A-3D illustrate various methods of injecting light from an input light source into a resonance cavity according to the present invention.
Figure 3B:
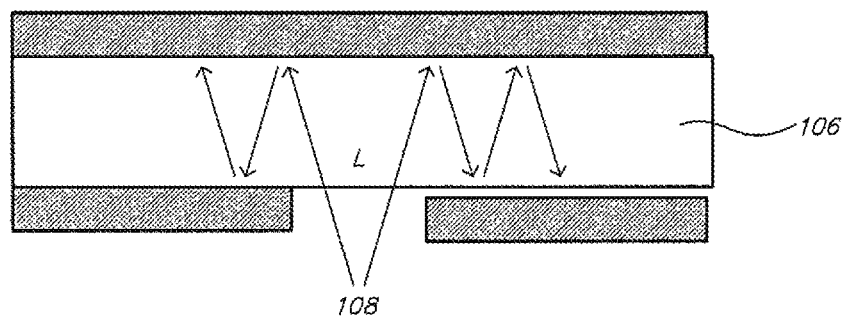
Figure 3C:
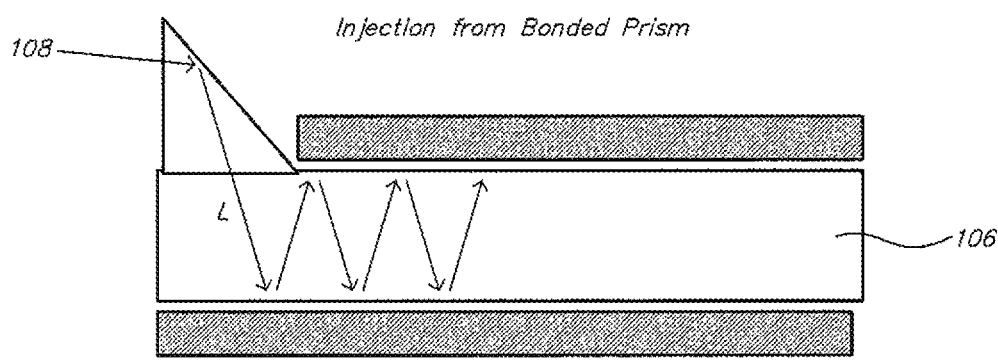
Figure 3D:
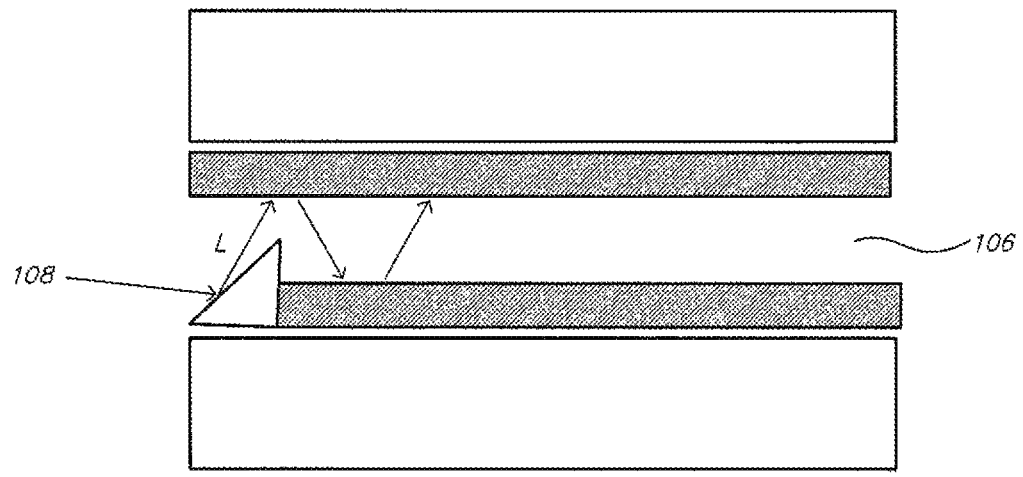

In a general embodiment of the present invention, with reference to FIGS. 2A and 2B, a Fabry-Perot interferometer or etalon device 100 is illustrated. FIG. 2A depicts a solid gap FPI, while FIG. 2B depicts an air gap FPI. The device 100 utilizes a plane parallel FPI 102 wherein the mirrors or reflective surfaces 104a,104b of the resonant cavity 106 are substantially different and the light L input to the device 100 is such that it is injected directly into the resonance cavity 106. As shown, the light L is injected at an angle $\theta$ off normal and on initial incidence does not pass through the reflective surface 102a. While in the cavity injected interferometer 102, each mirror 104a,104b has a different reflectivity from the other; the reflectivity of each of the plane mirrors 104a,104b is constant across their respective surfaces. Similar to the conventional FPI, collimated or divergent light can be used as the light source 108 to the device 100. This invention relies on a divergent (or not collimated) light source 108 with a spectral band width, in wavelength, narrow enough to be resolved into discrete interference orders by the FPI. For example, an etalon with an air gap of 1 cm may be used to make velocity measurements. It has a Free Spectral Range or a fringe spacing of approximately 15 GHz. One needs to have a laser with a spectral bandwidth significantly less than the FSR of 15 GHz. A laser with a spectral bandwidth of less than 0.15 GHz would be acceptable for most situations. However in general, the narrower the laser bandwidth, the better the performance and the results. It is widely known that illumination of a FPI with a divergent light source results in multiple interference orders being generated, as illustrated in FIG. 1 and FIG. 2. When collimated light sources are used with FPIs<1, the order of interference will be illuminated. In the preferred embodiment, the light source 108 for the cavity FPI 102 is a fiber optic (or plurality) and its divergence is controlled by a lens or lenses (not shown) prior to injection into the cavity of the FPI 102.

FIGS. 2A and 2B illustrate the requirement that the angle of incidence $\theta$ must be greater than zero for the input light.

This is necessary because otherwise the light would reflect back onto itself and not be launched into the etalon.

FIGS. 3A-3D illustrate the various methods of injection of the light L from the input light source 108 directly into the resonance cavity 106. The required angle of injection θ depends on the divergence and diameter of the input light source 108, and, hence, will be different for every application implementing this method. A consequence of the non-zero incident angle and divergent source is that the spectrum will have multiple interference orders.

The invention of a cavity injected FPI wherein multiple orders of interference are generated from a divergent source input has several applications in remote sensing including, but not limited to, Doppler Wind LIght Detection And Ranging (LIDAR), optical anemometers, and passive spectral emission monitoring. The advantage that a method using this device has over all other known technologies is that it offers a substantially higher optical efficiency without loss of resolution. Instrument systems that will implement the described method will require multi-element detectors to adequately resolve the multiple orders of interference generated by the FPI.

When a beam of light with a finite etendue (e.g., Solid Angle*Area) is injected into the cavity of an etalon, there is potential light-loss. As illustrated in FIGS. 4A and 4B, cavity injection may be performed by either inputting the input source light L through an aperture AP defined on the surface of an injection mirror IM (see FIG. 4A) or through an aperture AP defined along the outer edge of the injection mirror IM. Light loss occurs when the input source light L passes back through the aperture AP from where it was injected by being reflected by the injection mirror IM, or missing the reflective edge after reflection.

Figure 4:
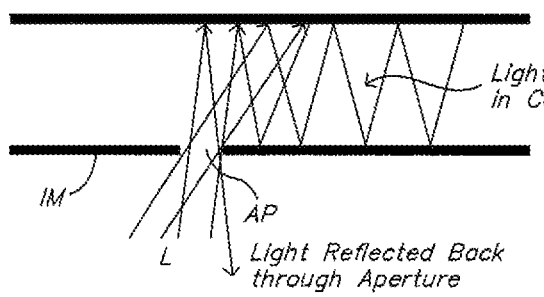
FIGS. 4A and 4B illustrate the occurrence of light loss during cavity injection of input source light through apertures defined on the surface of an injection mirror or defined along the outer edge of the injection mirror according to the present invention.
Figure 4:
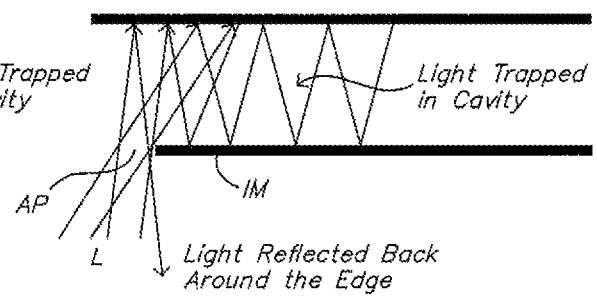

The efficiency of the injection process is determined by the size of the aperture where the light is imaged and injected, and by the divergence and size of the beam of light being injected into the cavity. FIG. 3 and FIG. 4 illustrate that if the light beam is injected at a large enough angle, then all of the light will be trapped in the cavity. However, this condition will generally cause the interference to occur at a high order, and if there is finite divergence, there will be many orders of interference in the fringe pattern. This tradeoff between efficiency and the number of orders of interference is the factor that will determine the overall efficacy of the cavity injection interferometer. With a large number of interference orders, a sufficiently large number of detection elements will be required to resolve the spectrum generated from the device. Charge Coupled Detectors (CCDs) that have thousands of pixels or detector elements that enable measurement and analysis of the higher orders are available. One skilled in the art could perform computations to optimize the interferometer efficiency based on the components and requirements of the system.

Figure 5:
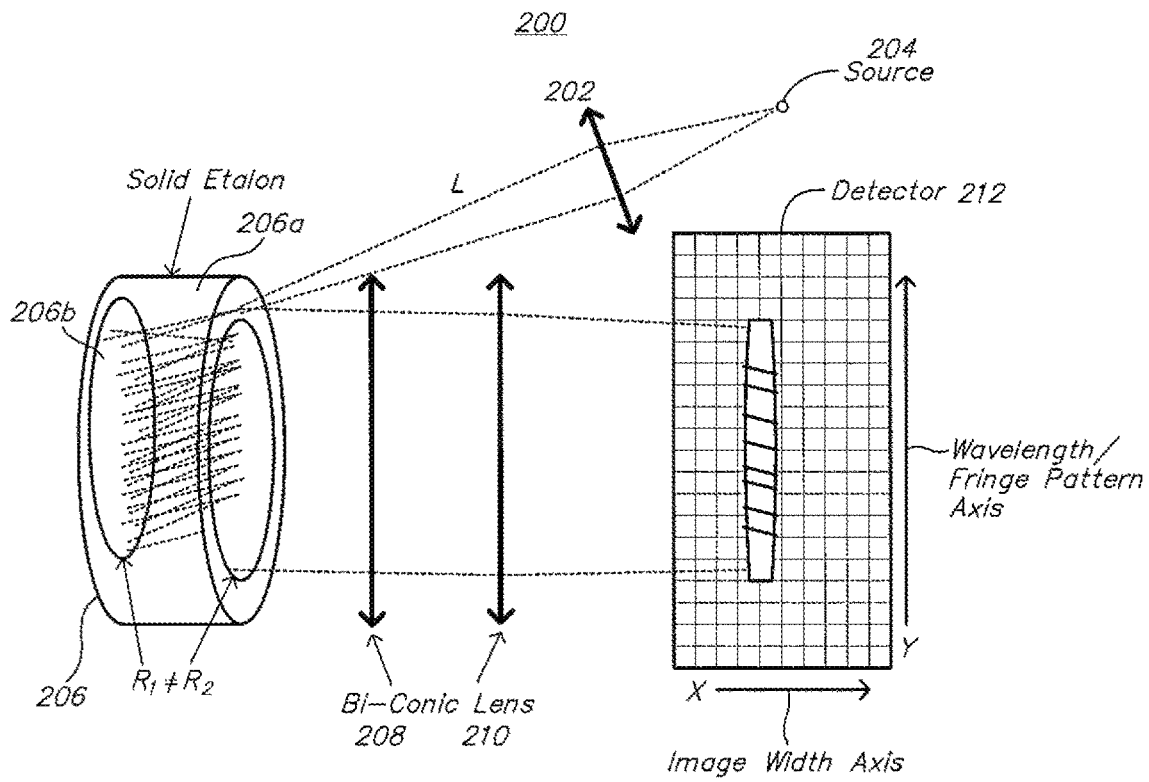
FIG. 5 illustrates a generalized optical layout for a cavity injection Fabry-Perot Interferometer with a single source fiber optic according to the present invention.

FIG. 5 illustrates the generalized optical layout for a cavity injection FPI 200 with a single source fiber optic according to the present invention. As shown, optics 202, such as a pair of bi-conic or cylindrical lenses, are used to control the size of the input light L from the light source 204 and the divergence of the input light L when injected into the etalon cavity 206a of the etalon 206 (in this example, a solid etalon). The light source 204 is positioned to direct the input light L so as to be inputted onto the first etalon surface 206b, wherein the first etalon surface 206b is also the highest reflecting surface to be encountered by the injected light L. On the output side of the etalon 206, bi-conic lenses 208,210 are used to image the fringe pattern FP onto a detector 212. The use of bi-conic lenses 208,210 ensures that the width of the projected image (x-axis) PI is minimized on the detector 212. Multiple orders of interference are projected along the Y-axis of the detector 212. Implementations of the detector 212 include but are not limited to using Image Intensified Charge Coupled Devices (ICCD), Electron Multiplied Charge Coupled Devices (EMCCD), or Charge Coupled Devices (CCD).

Also, while this preferred embodiment of the cavity injection FPI 200 incorporates bi-conic and cylindrical lenses for beam shaping, the present invention does not explicitly require their use nor is the invention necessarily limited to the use of those specific lenses. Other types of lenses known in the art would be applicable, including but not limited to Spherical, Bi-Convex, Bi-Concave, Plano-Convex, Plano-Concave, Positive Bestform, or Aspherical.

In operation, the injected beam should be directed toward the highest reflecting surface for maximum efficiency. Otherwise, the amount of light reflected by the first bounce will be lower than the desired configuration.

Figure 6:
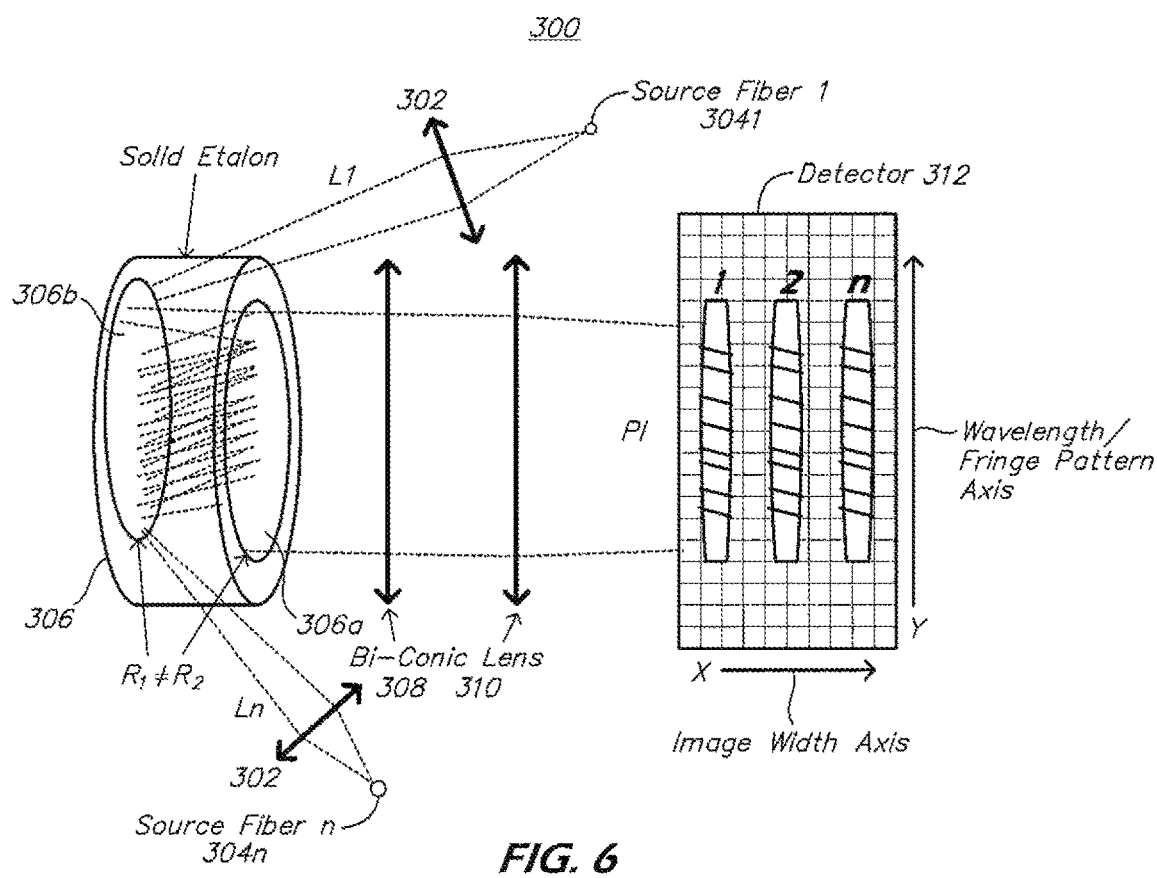
FIG. 6 shows a generalized optical layout for a cavity injection Fabry-Perot Interferometer with multiple fiber optic inputs according to the present invention.

FIG. 6 shows the generalized optical layout for the cavity injection FPI 300 with multiple fiber optic inputs. In this embodiment, optics 302, such as a spherical or aspherical lens, are used to control the size of the input light L1 from the first light source 3041 and the divergence of the input light L1 when injected into the etalon cavity 306a of the etalon 306 (in this example, a solid etalon). On the output side of the etalon 306, bi-conic lenses 308,310 are used to image the fringe pattern FP onto a detector 312. Here as well, the use of bi-conic lenses 308,310 ensures that the width of the projected image (x-axis) is minimized on the detector 312. Multiple orders of interference are projected along the Y-axis of the detector 312. Implementations of the detector 312 include but are not limited to using Image Intensified Charge Coupled Devices (ICCD), Electron Multiplied Charge Coupled Devices (EMCCD), or Charge Coupled Devices (CCD).

In addition, n light sources 304n, each having optics 302 as well, inject input light Ln at other edges of the etalon 306. The image PI projected onto the detector 312 has each of the 1-n light sources discretely identified by the corresponding number 1-n at the top of the fringe on the detector 312. As with the single fiber input embodiment, the light sources 3041-304n are positioned to direct the input light L1-Ln so as to be inputted onto the first etalon surface 306b, wherein the first etalon surface 306b is also the highest reflecting surface to be encountered by the injected light L1-Ln.

The following calculations consider a multi-beam Fabry-Perot Interferometer with different reflectances on its two reflecting plates. The two plate surfaces are denoted as 1 and 2, the properties for the exiting beam is indicated with the ( )' notation. The electric field is denoted by E with the entering field Eo. The transmittance is t and the reflectance is r where $t^2 = T$ and $r^2 = R$.

The derivation of an expression for the transmitted spectrum of a Fabry-Perot etalon is as follows:

$$E_{tn} = E_o t_1 t_2' r_1'^n r_2'^n \exp\{i(\omega t - n\delta)\}$$

Which when summed becomes $$E_t = \sum_{n=0}^{\infty} E_o t_1 t_2' (r_1' r_2')^n \exp\{i(\omega t - n\delta)\}$$

$$= \frac{E_o t_1 t_2' e^{i\omega t}}{1 - r_1' r_2' e^{-i\delta}}$$

The intensity of the beam $I = E_t E_t^*/2$ thus, $$\frac{I_t}{I_o} = \frac{T_1 T_2}{1 + R_1 R_2 - 2\sqrt{R_1 R_2}\ \cos(\delta)}$$

$$T_1 = 1 - R_1 - A_1$$

$$T_2 = 1 - R_2 - A_2$$

The expression for the Reflected Spectrum of a Fabry-Perot Etalon:

$$E_r = E_o e^{-i\omega t}\left[r_1 + \frac{r_2' t_1 t_1' e^{-i\delta}}{1 - r_1' r_2' e^{-i\delta}}\right]$$

The reflected beam intensity is then $$I_r = \frac{E_r E_r^*}{2} = I_o\left[r_1 + \frac{r_2' t_1 t_1' e^{-i\delta}}{1 - r_1' r_2' e^{-i\delta}}\right]\left[r_1 + \frac{r_2' t_1 t_1' e^{+i\delta}}{1 - r_1' r_2' e^{+i\delta}}\right]$$

$$= I_o\left[\frac{r_1^2 + r_2'^2(r_1'^2 + t_1 t_1')^2 + 2r_1 r_2'(r_1'^2 + t_1 t_1')\cos(\delta)}{1 + R_1 R_2 - 2\sqrt{R_1 R_2}\ \cos(\delta)}\right]$$

$$= I_o\left[\frac{R_1 + R_2(R_1 + T_1)^2 - 2\sqrt{R_1 R_2}\ (R_1 + T_1)\cos(\delta)}{1 + R_1 R_2 - 2\sqrt{R_1 R_2}\ \cos(\delta)}\right]$$

In the limit when $R_2 = R_1$ these expression become the familiar Fabry-Perot transmission and reflection equations that we know as follows:

$$\frac{I_t}{I_o} = \frac{T^2}{1 + R^2 - 2R\cos(\delta)}$$

$$T = 1 - R - A$$

And $$\frac{I_r}{I_o} = \frac{2R(1 - \cos(\delta))}{1 + R^2 - 2R\cos(\delta)}$$

Figure 7:
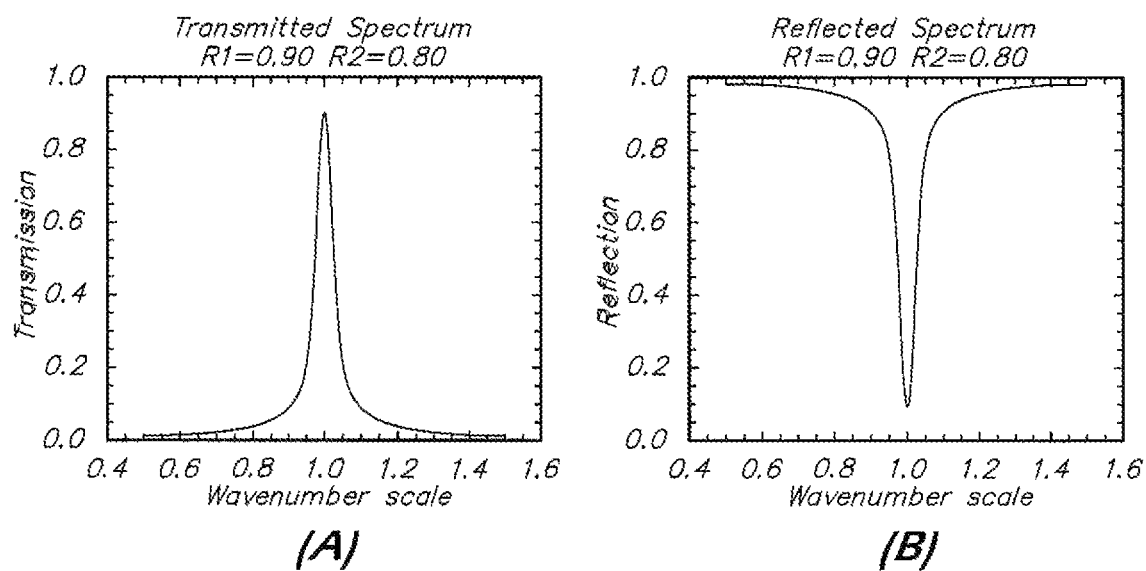
FIG. 7 illustrate the transmitted and reflected spectra of a conventional Fabry-Perot Interferometer.

Typical spectra for an interferometer with different reflectivities and injection through reflective coating are shown in FIGS. 7A and 7B.

If the light is injected directly into the cavity of an etalon, then the expressions for transmission and reflection become very different from the conventional Fabry-Perot device. Both transmission and reflections occur in the resonances of the cavity. This means that all of the light transmitted or reflected has a spectral signature very similar to that for transmission of a conventional etalon as follows:

a) Transmission a) Transmission $$\frac{I_t}{I_o} = \frac{T_2}{1 + R_1 R_2 - 2\sqrt{R_1 R_2}\ \cos(\delta)}$$

b) Reflection $$\frac{I_t}{I_o} = \frac{R_2 T_1}{1 + R_1 R_2 - 2\sqrt{R_1 R_2}\ \cos(\delta)}$$

This is interesting since the amount of information is clearly greater in this case than in the conventional Fabry-Perot device. That is because most of the spectral information is lost in the first reflection from the etalon, leaving only a small portion of the information available as transmitted spectra. The reflected spectrum for the normal etalon has most of the energy in the reflected continuum with a small spectral hole in the position of the resonance in the transmitted as seen in FIGS. 7A and 7B. That is why for an etalon with equal reflectivities, only $(1-R)/(1+R)$ of the energy is really available as a transmitted spectral signature. The reflected spectrum has a similar hole, but this is not as useful since there is a very large surrounding background.

Figure 8:
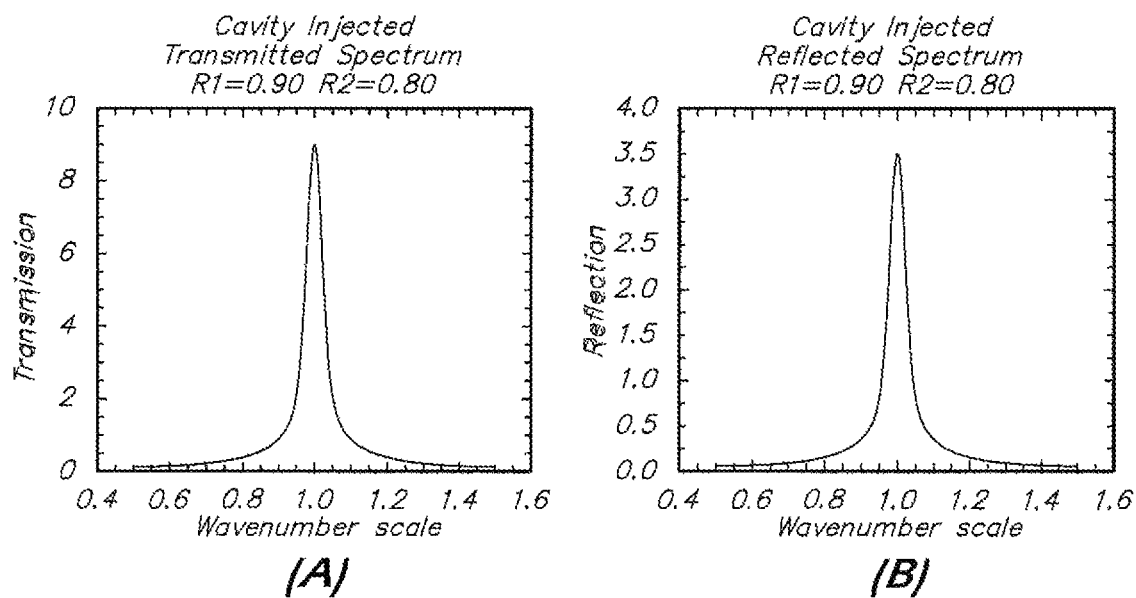
FIG. 8 illustrates the transmitted and reflected spectrum of a cavity injected etalon with one plate having a reflectivity of 90% and the other 80%.

The transmitted and reflected spectrum for the $R_1 = 0.90$ and $R_2 = 0.80$ case is shown in FIGS. 8A and 8B. There is a dramatic difference in the information content, where all the light exiting the cavity is in a resonance peak that has the same shape as the transmitted spectrum of a conventional FPI.

Figure 9:
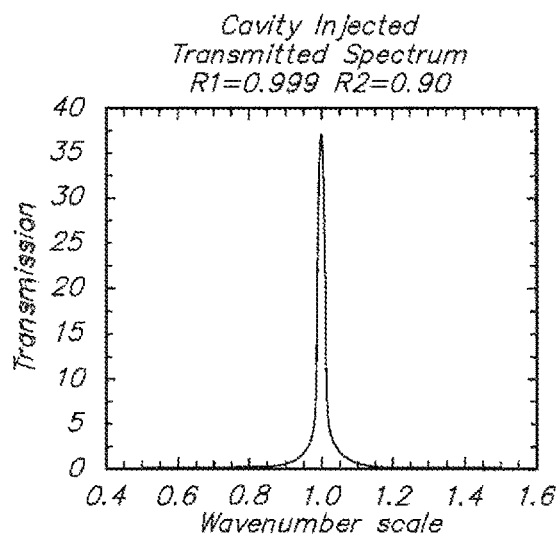
FIG. 9 illustrates the transmitted and reflected spectrum for a cavity injected etalon with one plate having a reflectivity of 99.9% and the other 90%.
Figure 9:
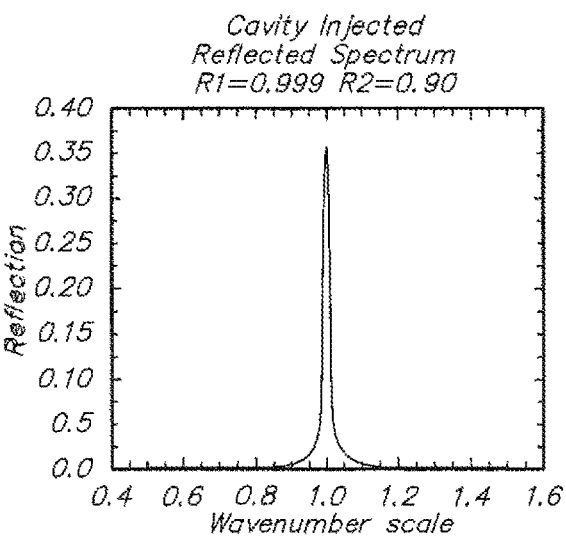

In the more impressive case where $R_1$ is set to 1.0, that is fully reflecting, all of the input energy is transmitted in a single resonance through the transmitted spectrum. As shown in FIGS. 9A and 9B, it is interesting to note that for this etalon, the peak in the spectrum is 37 times that for a normal etalon with $R = 0.90$ and the finesse is larger since the number of reflections in the cavity is twice the number when there are losses from both sides of the cavity. This increase in the spectrum peak is due to the fact that all of the light must eventually be transmitted from the cavity in the resonances, rather than the normal $(1-R)/(1+R)$ that is obtained from an equal reflectance cavity.

To determine the practical efficacy of the invention, numerical computation was performed since a full analytical derivation is not possible due to the inherent complexity of cavity injection method. A ray tracing algorithm was developed to simulate the dependence of the number of orders and optical transmission efficiency on input source size, input cavity angle and source divergence. This dependence was evaluated over a range of etalon plate spacing, index of refraction, and beam image size at the injection point in the cavity. It was assumed that the aperture or edge geometry will just match the image size and offset from the edge, and there will be no loss at the injection, only after the first reflection. The output of the algorithm delineates the efficiency, number of orders on the detector, and angle through the etalon as a function of the diameter of the light beam at the injection point and the tilt factor. The tilt factor is zero for normal injection, and 1.0 for injection where the center ray from the image just is tangent to the aperture, and thus is directly related to the angle of injection. Trade studies were carried out for fibers with diameters from 10 to 50 microns in diameter and for numerical apertures from 0.10 to 0.22. While these fiber characteristics are part of the preferred embodiment, the invention does not limit the fiber source diameter or numerical aperture. For LIDAR systems, the aforementioned parameters correspond to instrument systems that have a divergence much larger than the diffraction limit and thus represent multiple interference order systems that do not rely upon collimated light as a source input.

Figure 10:
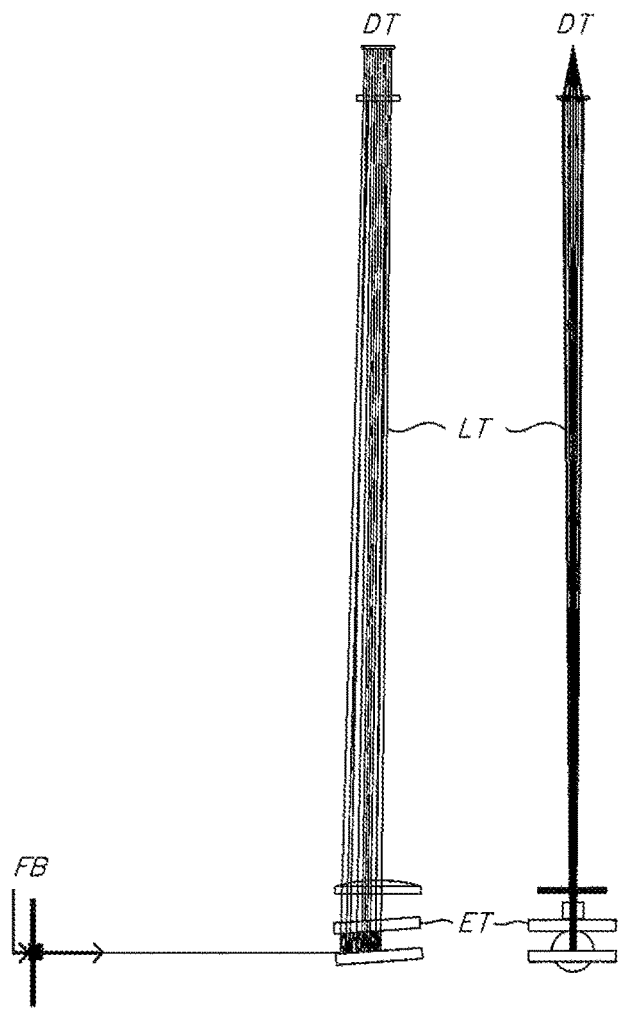
FIG. 10 illustrates a side view of cavity injection Zemax model according to the present invention.

To illustrate that a practical optical design of the invention is possible and to examine the details of the images that will be produced on the detector, a non-sequential model was created using optical ray tracing modelling software. One such known modelling software is Zemax which is used to design and analyze imaging systems such as camera lenses, as well as illumination systems. It can model the effect of optical elements, and can produce standard analysis diagrams such as spot diagrams and ray-fan plots. With Zemax, the model used simple injection geometry to illustrate that practical implementation of the cavity injection method is possible. The model created here uses a small mirror in the cavity to act as the injection point rather than injecting at an edge or through an aperture in the mirror coating. This simplification reduces the complexity of modeling this system; however it is not a requirement for implementing this method in a real system. The model developed used a 10 micron fiber with a NA=0.22. The source diameter was magnified to a diameter of 300 microns at the injection mirror, which is located at the edge of the etalon. Aspheric imaging lenses were used in this system to simplify the design. FIG. 10 shows a side view of the system modeled in Zemax.

Figure 11:
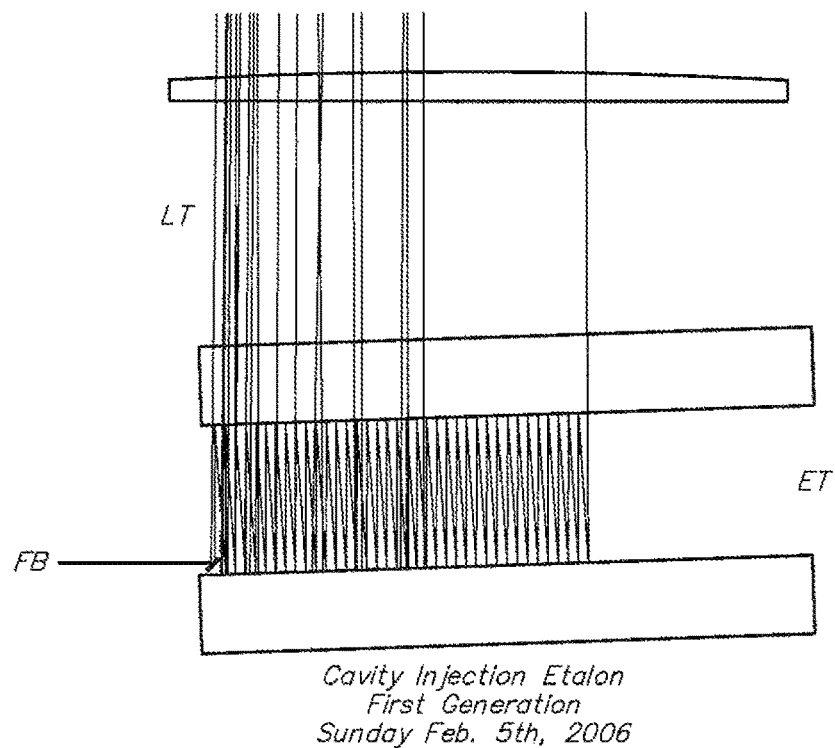
FIG. 11 illustrates a close up view of the cavity injection from an angled mirror in the cavity according to the present invention.

In the system modeled in FIG. 10, the detector DT is at the top of the drawing and the fiber FB is at the left side. Note that the etalon ET is tilted to the desired angle of incidence rather than tilting the light beam LT; this was done to reduce the complexity of the geometry. A detailed view of the light injection at the etalon ET is shown in FIG. 11 from the angled mirror MR in the cavity CV.

The lens LN1 located above the etalon ET in FIG. 10 is a biconic lens and the lens LN2 just below the detector DT is a cylindrical lens. For the Zemax simulation, interference effects are neglected, but the image size is accurately determined.

FIG. 1 illustrates a width of spectrum in non-wavelength axis of interference (left plot), an illumination envelope where interference pattern would be located (center plot), an image projected from Zemax model on to detector (right plot), wherein interference orders are aligned top to bottom with a width from left to right. The plot on the far right is the image that will be formed at the detector for a single fiber injected into the Fabry-Perot cavity (see FIG. 11).

Figure 12:
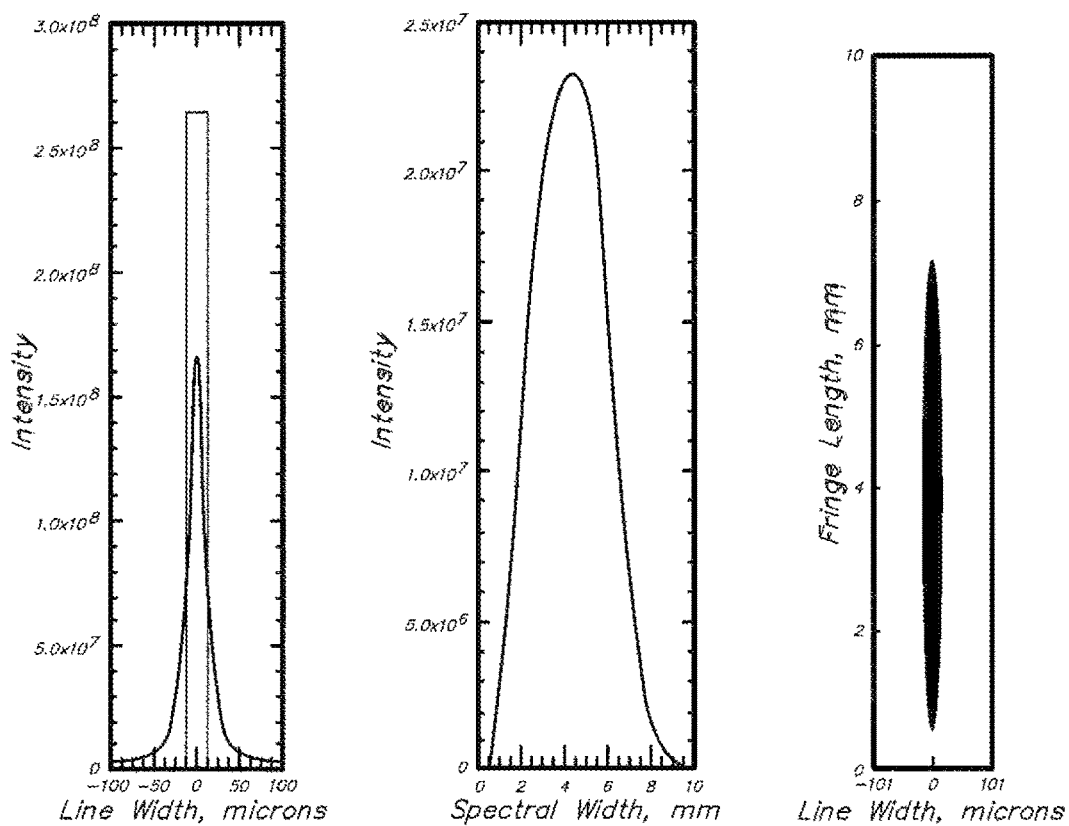
FIG. 12 illustrates a width of spectrum in non-wavelength axis of interference (left plot), an illumination envelope where interference pattern would be located (center plot), and an image projected from Zemax model on to detector (right plot), according to the present invention.

The spectrum generated from this single fiber injection is very narrow, with a Full Width at Half Max (FWHM) of 18 microns (left plot of FIG. 12). Narrow spectral widths enable the use of multi-element time resolved detectors to be used with single pixel resolution. Streaking Charge Coupled Devices (CCDs) are ideally suited as the detector element to be used with cavity injection FPI based LIDAR systems. With modern streaking CCD technology the spectral width of 18 microns corresponds to 50 meters in range for spectral imaging LIDAR systems. The center plot of FIG. 12 shows that the spectrum of interference would be superimposed on the spectral width.

Figure 13:
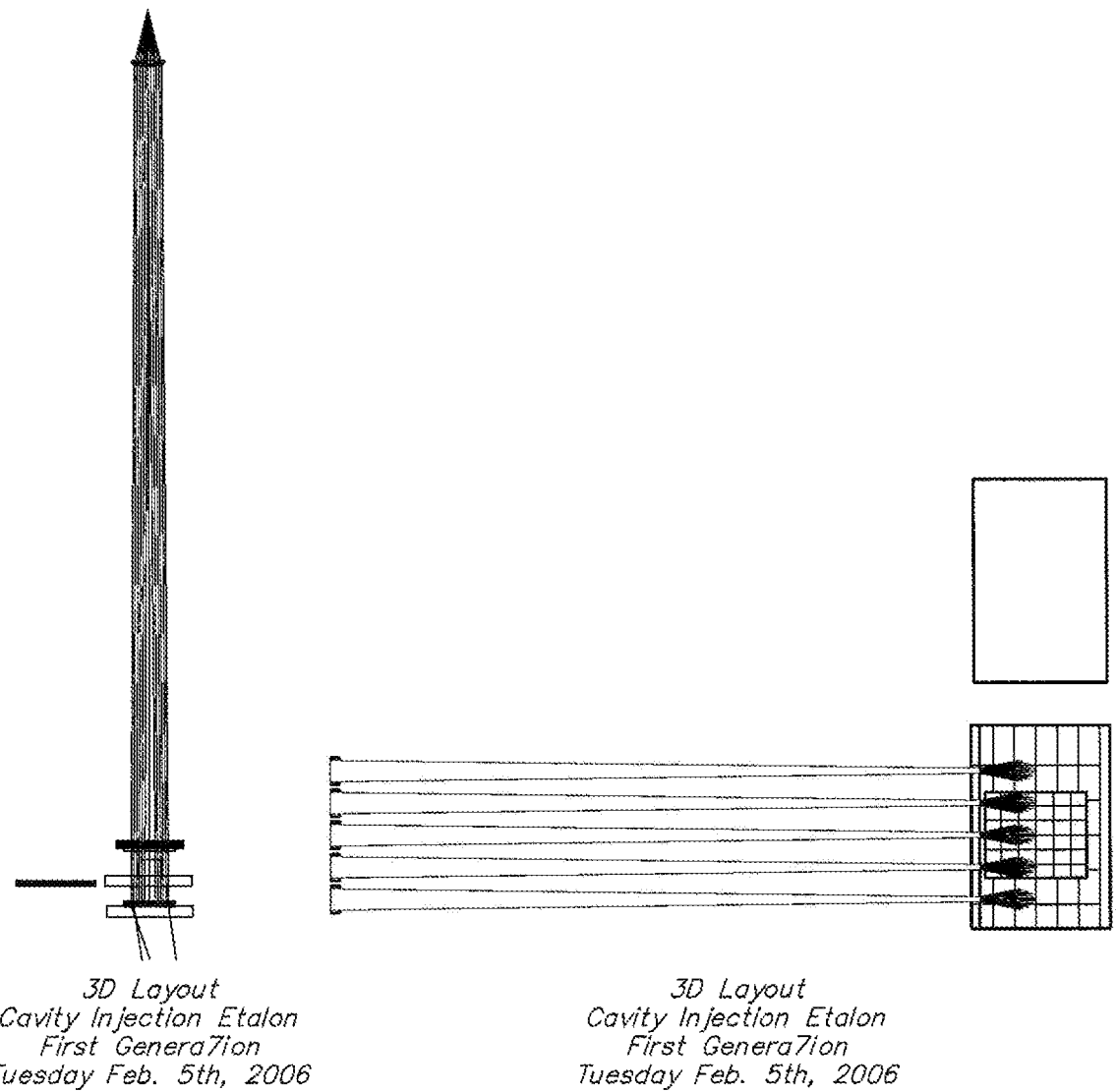
FIG. 13 illustrates Zemax model of a 5 fiber cavity injection according to the present invention.
Figure 14:
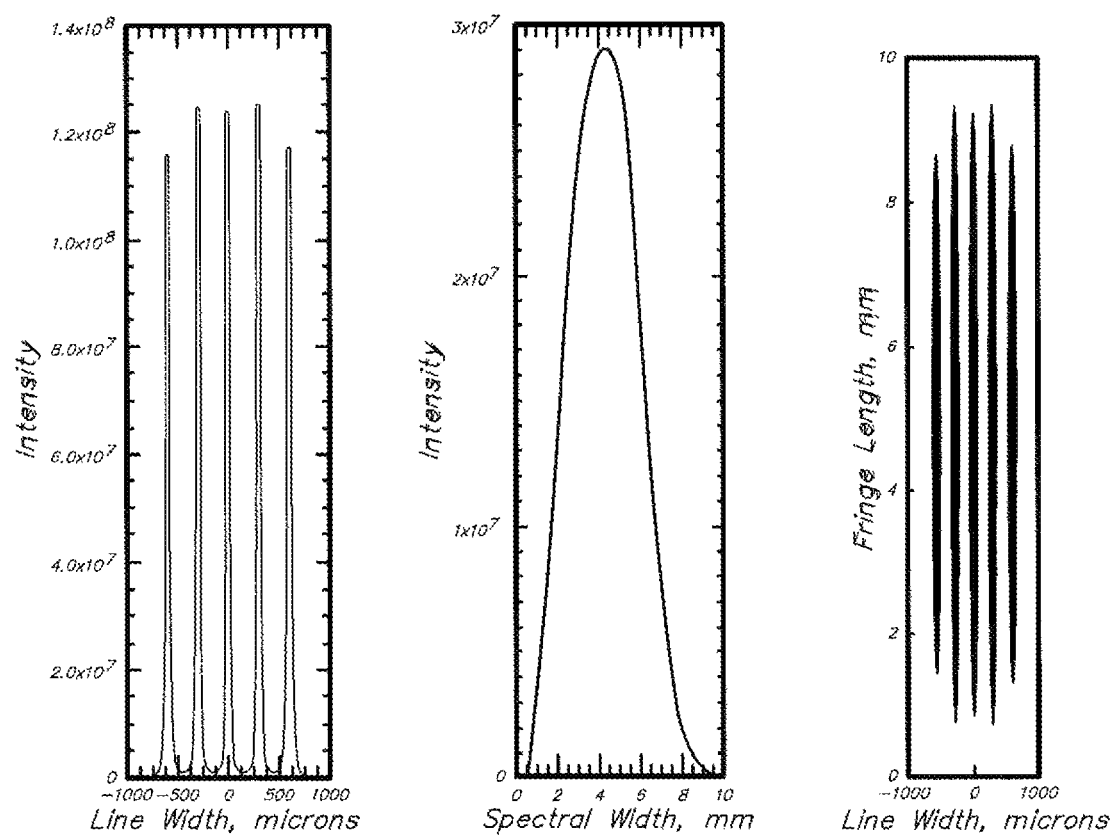
FIG. 14 illustrates width of spectrum in non-wavelength axis of interference for each of the five input fibers (left plot), an illumination envelope where interference pattern would be located (center plot), and an image projected from Zemax model on to detector (right plot according to the present invention.
Figure 15:
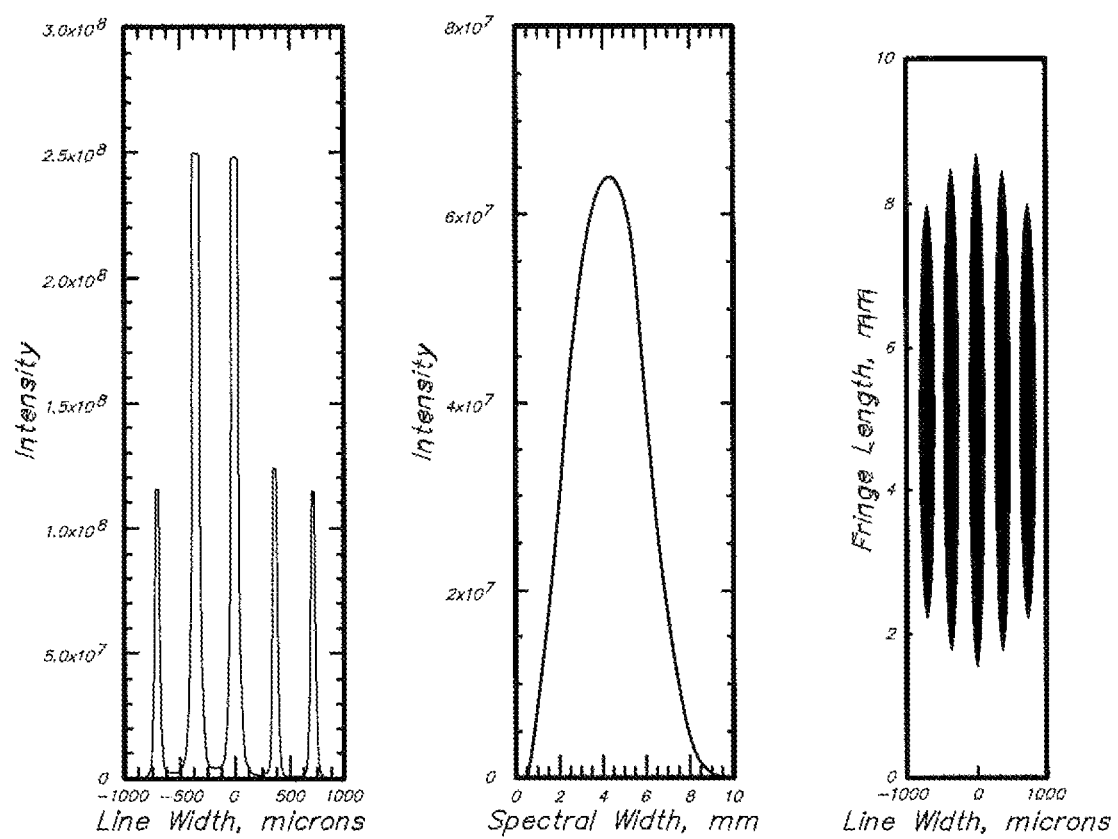
FIG. 15 illustrates a width of spectrum in non-wavelength axis of interference for multiple fiber bundle inputs (left plot), an illumination envelope where interference pattern would be located (center plot), and an image projected from Zemax model on to detector (right plot), according to the present invention.
Figure 16:
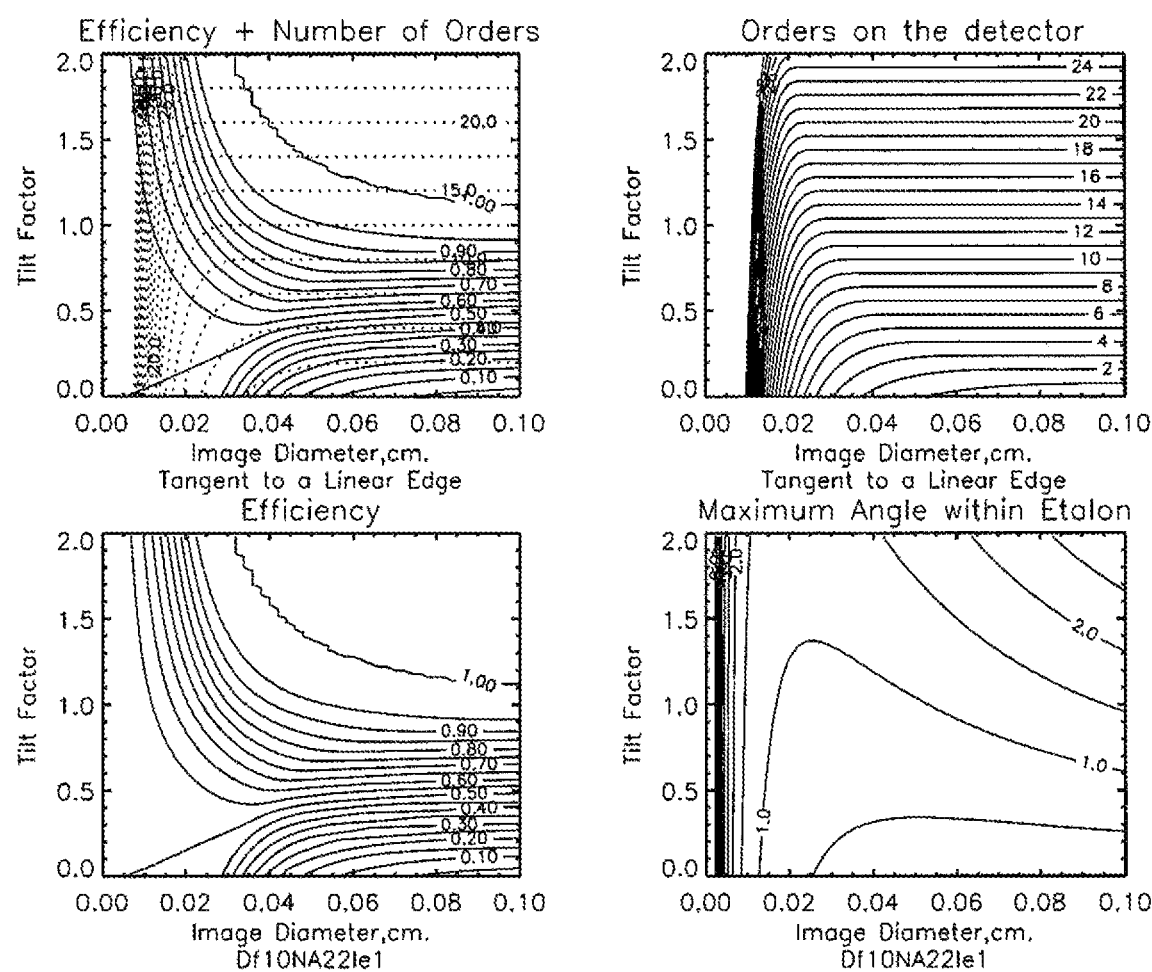
FIG. 16 illustrates trade studies evaluating parameter space of cavity injection FPI for a 10 micrometer input source fiber, according to the present invention.

FIG. 13 illustrates the method implementation whereby fibers FB are used as simultaneous inputs to the device. In this embodiment, five (5) fibers FB separated by 0.6 cm along the edge of the etalon ET are injected into the cavity CV. Each fiber FB has its own imaging lens IL and the light LT enters at the side of the etalon ET just as in the case of a single fiber (see FIG. 11). The image on the detector DT is similar to that shown in FIG. 12; however, five distinct line images corresponding to the five fibers are seen. The five images are the same width, 18 microns, as in the single fiber case. The implication of this embodiment of the cavity injected FPI is that N spectral events can be monitored simultaneously from N unique inputs, where N>1.

FIG. 2 shows a width of spectrum in non-wavelength axis of interference for multiple fiber bundle inputs (left plot), an illumination envelope where interference pattern would be located (center plot), and an image projected from Zemax model on to detector (right plot), wherein interference orders would be aligned top to bottom with a width from left to right. As seen in the plot are the five (5) distinct lines derived from each of the five inputs to the system. These drawings are directed to determining whether it is possible to add fibers together at each of the places where there was only a single fiber in this case. In other words, four fibers which are tangent are placed at the five fiber positions to get a total of 20 fibers injecting light into the etalon. As shown, the five (5) distinct lines derived from each of the five inputs to the system where four fibers are added to positions 2 and 3 tangent to each other.

As shown, the spectra are still distinct, but slightly broader. However it will still be possible to separate the spectra from the regions where there are four fibers without great difficulty. Cases have been examined where there have been as many as nine (9) fibers placed side by side and the spectra were still reasonably separated.

Figure shows an example output from the numerical simulation algorithm for a fiber diameter of 10 microns and numerical aperture of 0.22 injected at the edge of an etalon. The simulation results indicate that the efficiency is very high for systems with 10 to 15 orders of interference imaged on to the detector.

Figure 17:
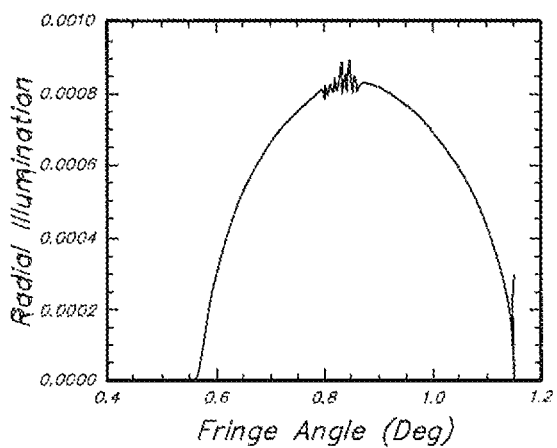
FIG. 17 illustrates simulated laser or aerosol backscatter spectrum from a cavity injection FPI, according to the present invention.
Figure 17:
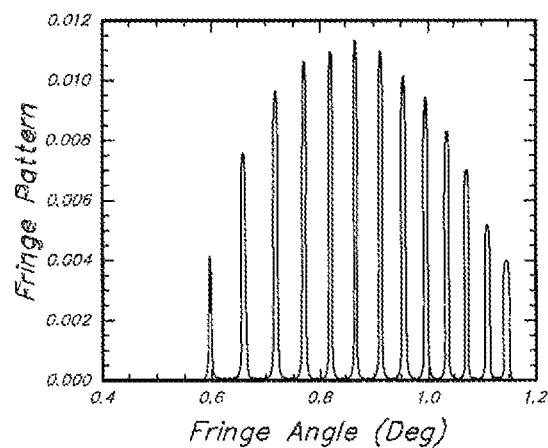
Figure 17:
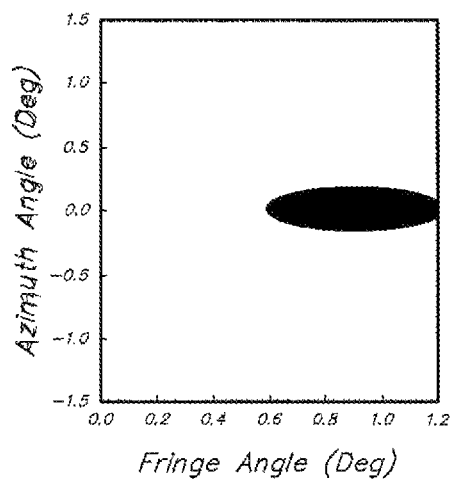
Figure 17:
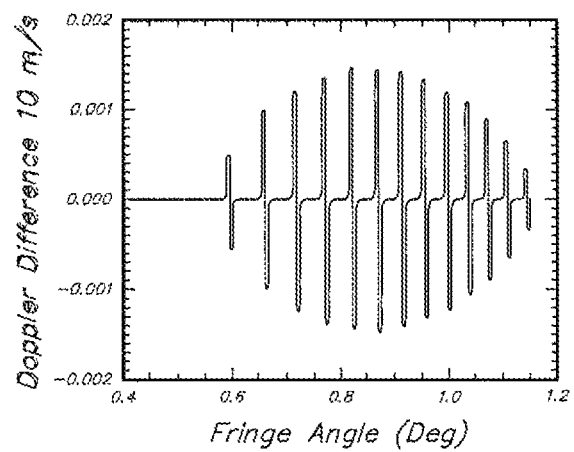

FIG. 17 shows the laser spectrum that results when a 10 micron fiber with NA=0.22, and imaged with a 0.03 cm diameter spot at the edge of the etalon. The laser spectrum has thirteen interference orders that are imaged on the detector with an efficiency of ~95%. The laser spectrum represents the line shape expected from typical lasers that would be considered for applications implementing this method as well as that from backscatter from atmospheric aerosols.

Figure 18:
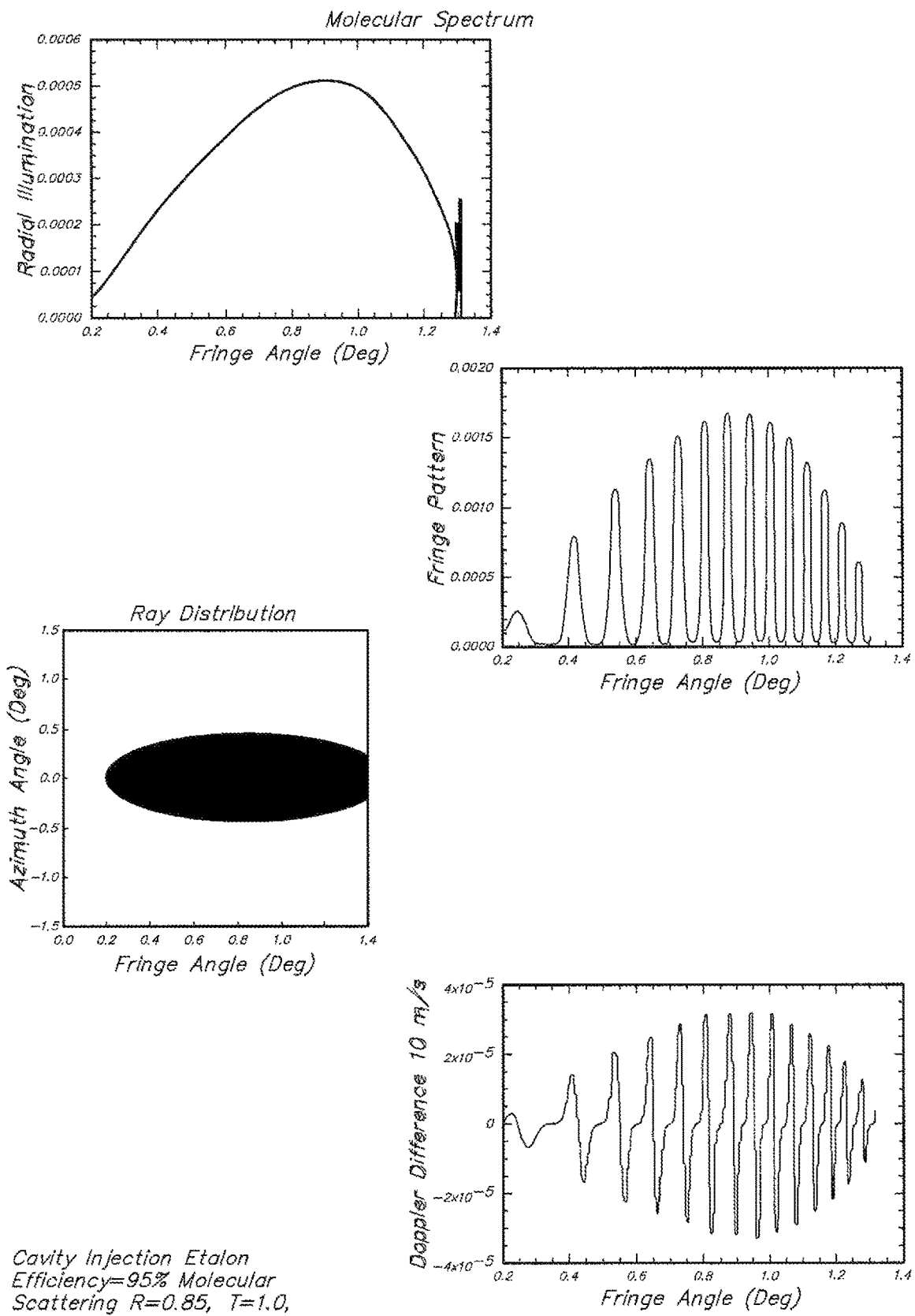
FIG. 18 illustrates simulated molecular backscatter spectrum from a cavity injection FPI, according to the present invention.
Figure 19:
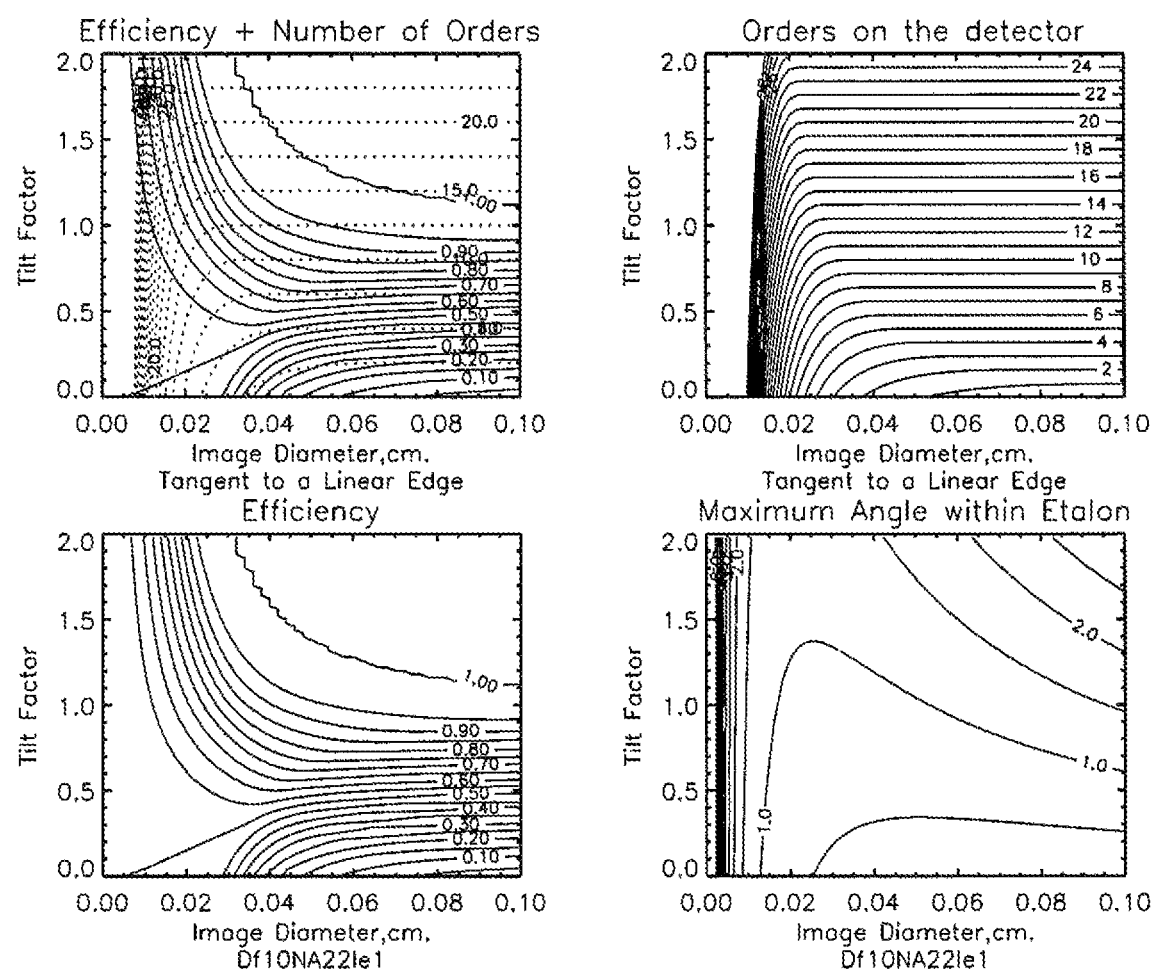
FIG. 19 illustrates a trade simulation of expected efficiency vs. number of orders for fiber diameters at 10 microns, according to the present invention.
Figure 20:
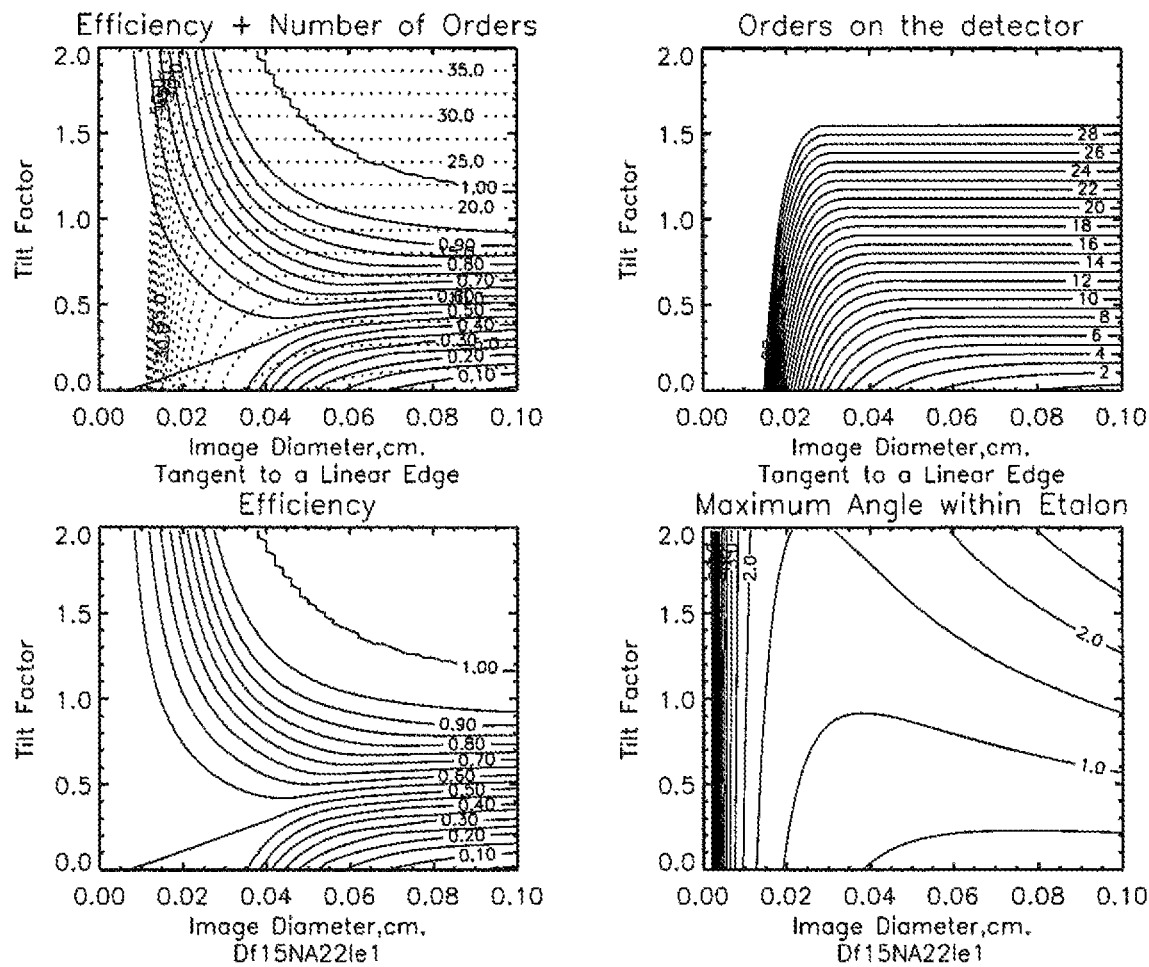
FIG. 20 illustrates a trade simulation of expected efficiency vs. number of orders for fiber diameters at 20 microns, according to the present invention.
Figure 21:
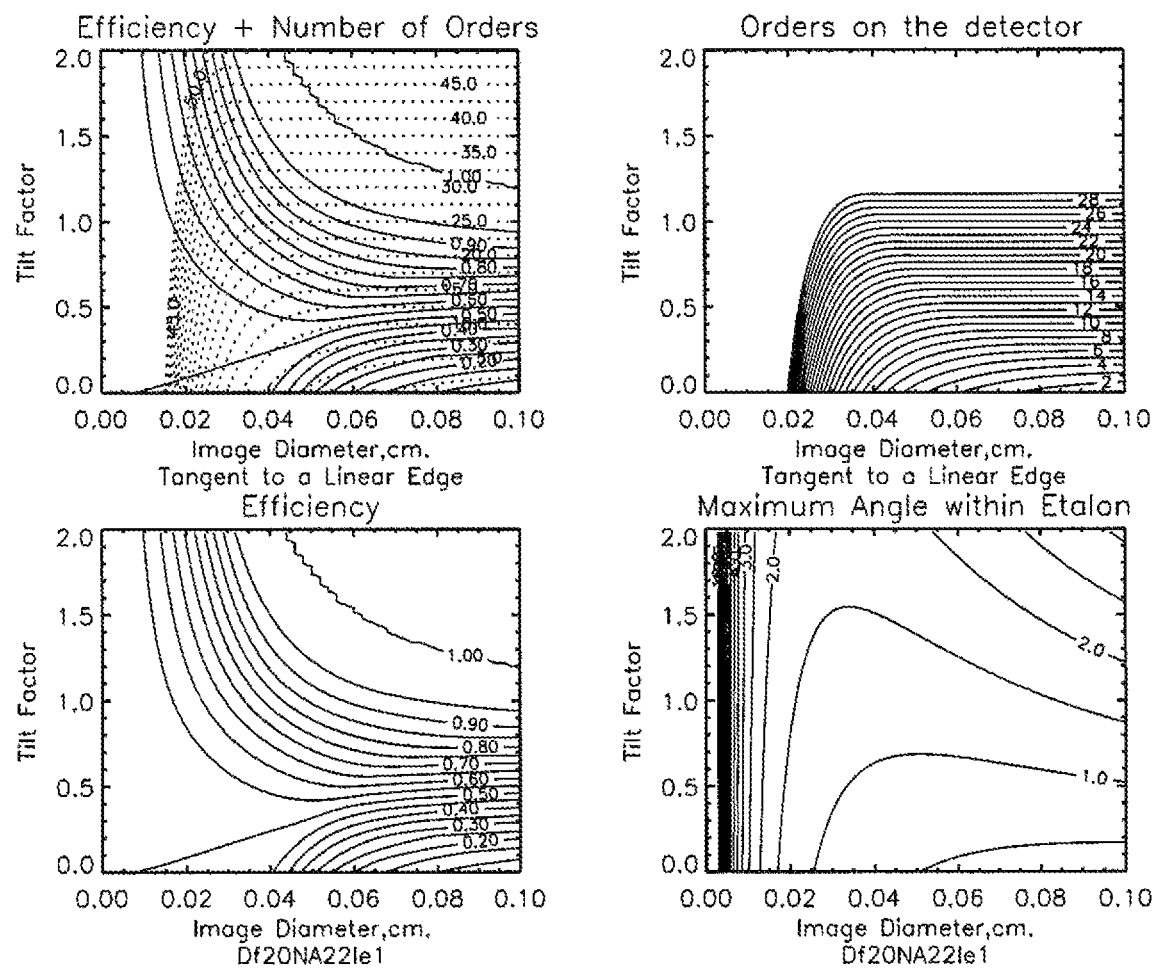
FIG. 21 illustrates a trade simulation of expected efficiency vs. number of orders for fiber diameters at 30 microns, according to the present invention.
Figure 22:
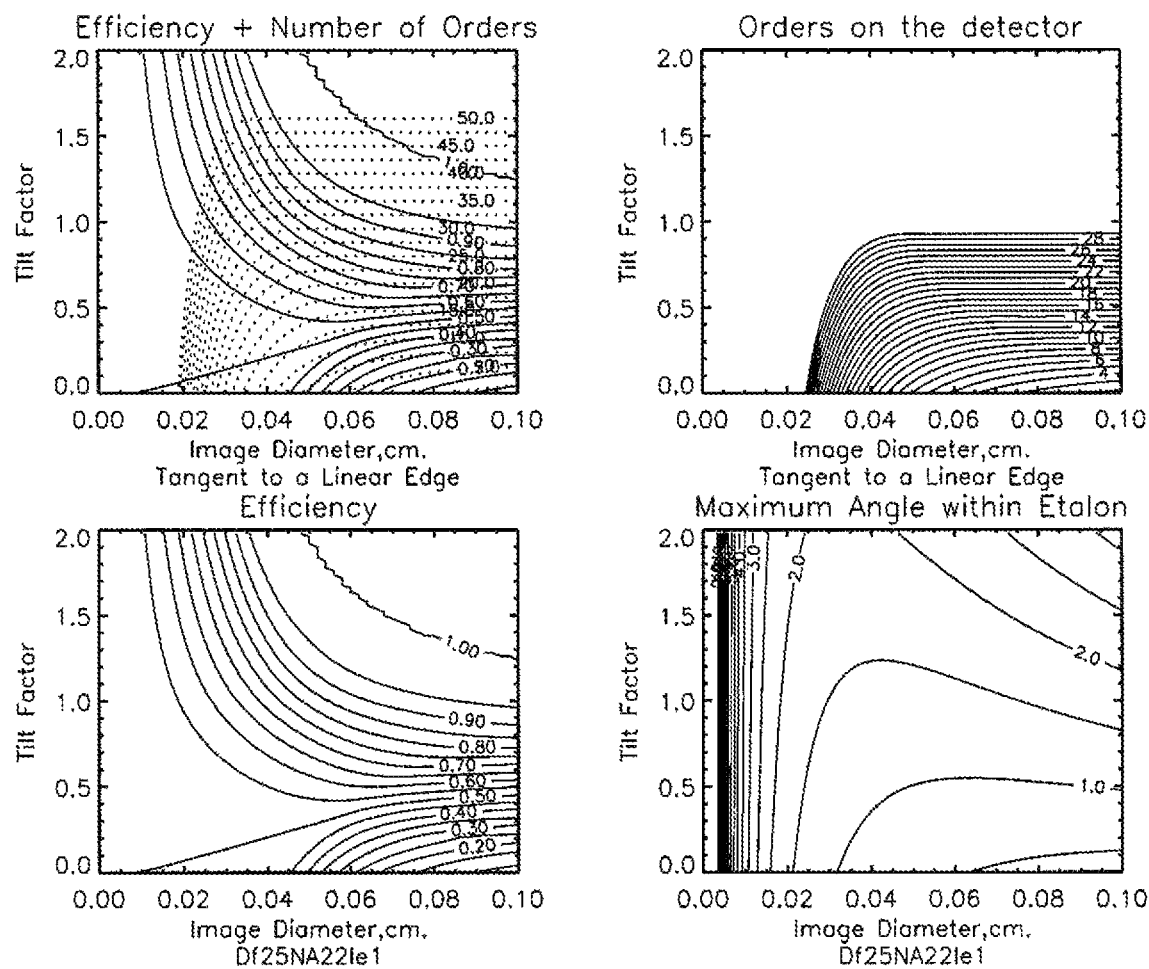
FIG. 22 illustrates a trade simulation of expected efficiency vs. number of orders for fiber diameters at 40 microns, according to the present invention.
Figure 23:
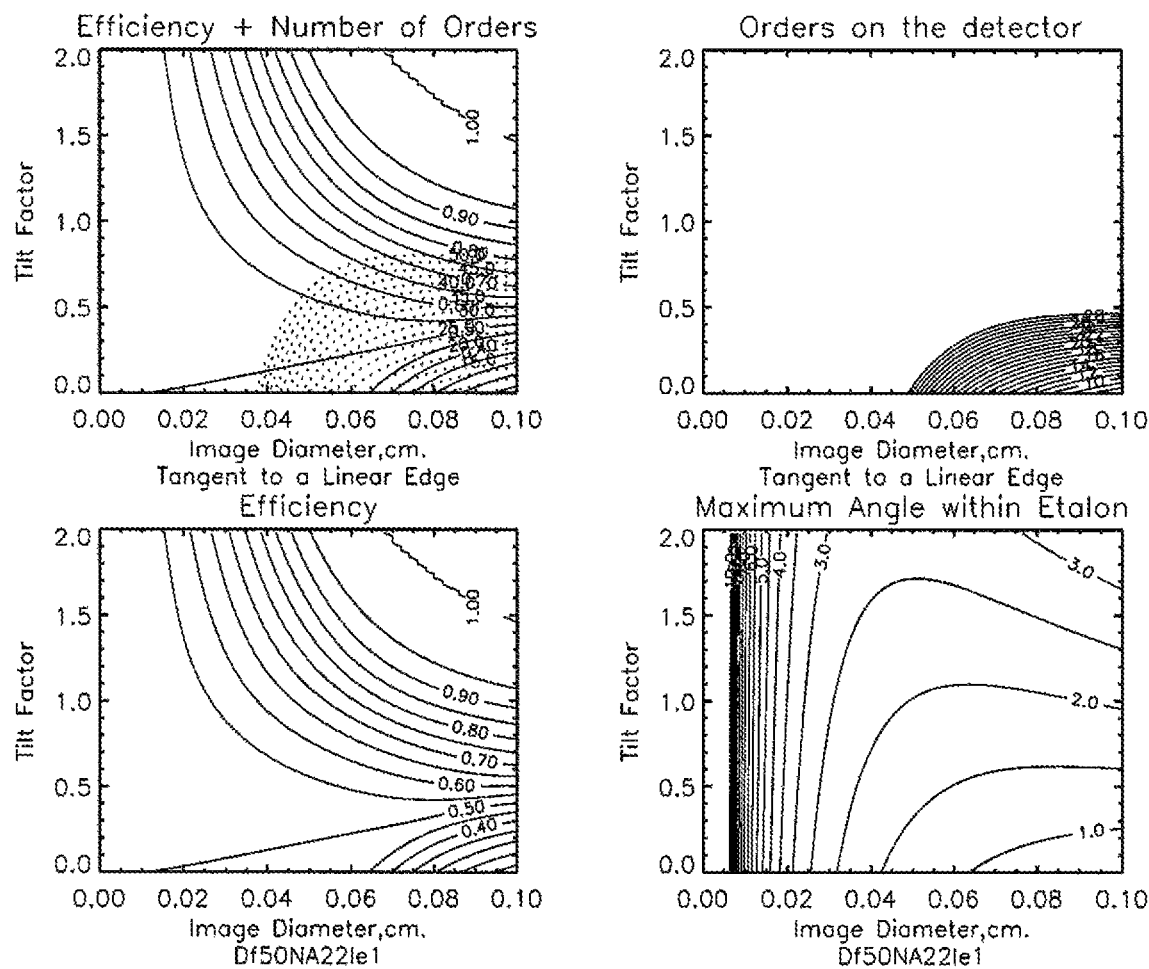
FIG. 23 illustrates a trade simulation of expected efficiency vs. number of orders for fiber diameters at 50 microns.

FIG. 18 illustrates the interference pattern generated from backscatter from atmospheric molecules. The spectra shown in FIG. 17 and FIG. 18 are well suited for use in LIDAR applications as there is sufficient spectral resolution for the number of orders present. The cavity injection method has advantages over all other known technologies since it has extremely high efficiency without loss of finesse. For the case described (FIG. 18) the conventional Fabry-Perot would be 18 times less efficient. Since there are several parameters that uniquely determine the specific number of orders and the corresponding efficiency for a particular configuration, such as image diameter, beam divergence, order spacing, detector spatial resolution, optical input angle, finesse, free spectral range and source line width, a very high number of combinations will yield solutions that are favorable for LIDAR and other high spectral resolution imaging applications.

FIGS. 19-23 illustrate trade simulations of expected efficiency vs. number of orders for fiber diameters ranging from 10-50 microns. These trade simulations provide design parameters and show that as the source fiber increases in diameter, more orders must be imaged at the detector in order to attain the same efficiency as when a smaller source is used. For example, when using a 10 micron fiber source, maximum efficiency of the etalon through put can be achieved when approximately 12 orders of interference are imaged. However, when a 25 micron fiber source is used to illuminate the etalon, approximately 35 orders must be imaged to achieve maximum efficiency. These trades can have tremendous impact on instrument design in terms of size and weight.

It should be appreciated that the various aspects and embodiments of the present invention as disclosed herein are merely illustrative of specific ways to make and use the invention and do not therefore limit the scope of the invention when taken into consideration with the appended claims and the following detailed description and the accompanying Figures. Features from one aspect and embodiment of the invention as disclosed herein can be combined with features from other aspects and embodiments of the invention.

Having thus described the present invention in detail, it is to be understood that the foregoing detailed description of the invention is not intended to limit the scope of the invention thereof. One of ordinary skill in the art would recognise other variants, modifications and alternatives in light of the foregoing discussion.

We claim:

1. A method for conducting measurement of a Doppler shift caused by molecular and aerosol movement while simultaneously providing measurement of temperature using LIDAR, the method comprising the steps of:
   providing a light source;
   providing a Fabry-Perot etalon having a resonant cavity formed with first and second plane parallel reflecting surfaces and an aperture defined on the first plane parallel reflecting surfaces, wherein the first plane parallel reflecting surface is formed with a reflectivity different from the second plane parallel reflecting surface; and
   injecting light from the light source through the aperture and into a plane parallel resonant cavity of the Fabry-Perot etalon at an angle of incidence other than normal to the first and second plane parallel reflecting surfaces by directing the light to bypass the first plane parallel reflective surface of the plane parallel resonator cavity and minimize light-loss in the injected light.

2. A method according to claim 1, wherein the step of providing the light source includes providing a divergent light source.

3. A method according to claim 1, wherein the step of injecting the light from the light source through the aperture includes directing the light into the plane parallel resonant cavity through a non-reflective aperture in the first plane parallel reflective surface.

4. A method according to claim 1, wherein the step of injecting the light from the light source through the aperture includes directing the light into the plane parallel resonant cavity through a non-reflective edge portion in at least the first plane parallel reflective surface.

5. A method according to claim 1, further comprising the steps of:
   providing a plurality of divergent light sources; and
   injecting light from the plurality of light sources into the plane parallel resonant cavity of the Fabry-Perot etalon.

6. A light resolving device, comprising:
   a light source; and
   a Fabry-Perot etalon having a resonant cavity formed with first and second plane parallel reflecting surfaces and an aperture defined on the first plane parallel reflecting surfaces, wherein
   the first plane parallel reflecting surface is formed with a reflectivity different from the second plane parallel reflecting surface, and
   the light source is operatively positioned relative to the a Fabry-Perot etalon such that light from the light source is injected through the aperture and into a plane parallel resonant cavity of the Fabry-Perot etalon at an angle of incidence other than normal to the reflecting surfaces and directed to bypass the first plane parallel reflective surface of the plane parallel resonator cavity so as to minimize light-loss in the injected light.

7. A device according to claim 6, wherein the light source includes a divergent light source.

8. A device according to claim 6, wherein the aperture of the Fabry-Perot etalon includes a non-reflective aperture in at least the first plane parallel reflective surface thereof through which the light is directed into the plane parallel resonant cavity of the Fabry-Perot etalon.

9. A device according to claim 6, wherein the aperture of the Fabry-Perot etalon includes a non-reflective edge portion in at least the first plane parallel reflective surface through which the light is directed into the plane parallel resonant cavity of the Fabry-Perot etalon.

10. A device according to claim 6, further comprising:
    a detector for detecting a fringe pattern outputted by the Fabry-Perot etalon.

11. A Doppler wind LIDAR including a light resolving element according to claim 6.

12. An optical air data system including a light resolving element according to claim 6.

13. A high spectral resolution interferometer including a light resolving element according to claim 6.

* * * * *